United States Patent
Kreuzer et al.

(10) Patent No.: US 8,327,716 B2
(45) Date of Patent: Dec. 11, 2012

(54) OPTICAL STRAIN GAUGE

(75) Inventors: Manfred Kreuzer, Weiterstadt (DE);
Tobias Kipp, Roedermark (DE);
Thomas Kleckers, Griesheim (DE)

(73) Assignee: Hottinger Baldwin Messtechnik GmbH, Darmstadt (DE)

( * ) Notice: Subject to any disclaimer, the term of this patent is extended or adjusted under 35 U.S.C. 154(b) by 291 days.

(21) Appl. No.: 12/449,674

(22) PCT Filed: Feb. 19, 2008

(86) PCT No.: PCT/EP2008/001258
§ 371 (c)(1),
(2), (4) Date: Sep. 2, 2009

(87) PCT Pub. No.: WO2008/101657
PCT Pub. Date: Aug. 28, 2008

(65) Prior Publication Data
US 2010/0300209 A1    Dec. 2, 2010

(30) Foreign Application Priority Data
Feb. 19, 2007   (DE) .................. 10 2007 008 464

(51) Int. Cl.
*G01L 1/24* (2006.01)
(52) U.S. Cl. ........................................ 73/800
(58) Field of Classification Search .......... 73/800
See application file for complete search history.

(56) References Cited

U.S. PATENT DOCUMENTS

| | | | |
|---|---|---|---|
| 3,670,091 A | 6/1972 | Frantz et al. | |
| 3,749,601 A | 7/1973 | Tittle | |
| 5,057,457 A | 10/1991 | Miyahara et al. | |
| 5,097,317 A | 3/1992 | Fujimoto et al. | |
| 5,379,186 A | 1/1995 | Gold et al. | |
| 5,382,829 A | 1/1995 | Inoue | |
| 5,726,744 A | 3/1998 | Ferdinand et al. | |
| 5,793,118 A | 8/1998 | Nakajima | |
| 5,869,355 A | 2/1999 | Fukaya | |
| 5,889,232 A | 3/1999 | Ichikawa et al. | |

(Continued)

FOREIGN PATENT DOCUMENTS
DE    196 48 403    4/1998
(Continued)

OTHER PUBLICATIONS

PCT, International Search Report of the International Searching Authority for International Application PCT/EP2008/001258, mailed Jun. 4, 2008, 3 pages, European Patent Office, HV Rijswijk, Netherlands.

(Continued)

*Primary Examiner* — Lisa Caputo
*Assistant Examiner* — Octavia Davis-Hollington
(74) *Attorney, Agent, or Firm* — W. F. Fasse

(57) ABSTRACT

An optical strain gage incorporates an optical waveguide or fiber that includes a sensing section with a fiber Bragg grating, which serves for detecting a strain in a strainable member on which the strain gage is mounted. At locations displaced away from the fiber Bragg grating section, on both sides thereof, the optical waveguide is covered by two fastening elements, which secure the optical waveguide in a force-transmitting manner on the strainable member or a bottom support. Between the two fastening elements, a relatively soft elastic fixing material surrounds the optical waveguide and fixes the fiber Bragg grating section on the strainable member or bottom support in a form-fitting and force-isolating manner.

15 Claims, 1 Drawing Sheet

U.S. PATENT DOCUMENTS

| | | | |
|---|---|---|---|
| 5,936,492 A | 8/1999 | Shingyoji et al. | |
| 5,971,046 A | 10/1999 | Koch et al. | |
| 6,125,216 A | 9/2000 | Haran et al. | |
| 6,191,492 B1 | 2/2001 | Yamazaki et al. | |
| 6,246,048 B1 | 6/2001 | Ramos et al. | |
| 6,276,215 B1 * | 8/2001 | Berg | 73/800 |
| 6,326,680 B1 | 12/2001 | Steijer et al. | |
| 6,440,772 B1 | 8/2002 | Smith | |
| 6,519,388 B1 | 2/2003 | Fernald et al. | |
| 6,563,970 B1 * | 5/2003 | Bohnert et al. | 385/13 |
| 6,586,722 B1 | 7/2003 | Kenny et al. | |
| 6,626,043 B1 * | 9/2003 | Bailey et al. | 73/705 |
| 6,720,550 B2 | 4/2004 | Bennett et al. | |
| 6,768,825 B2 * | 7/2004 | Maron et al. | 385/13 |
| 6,776,045 B2 * | 8/2004 | Fernald et al. | 73/705 |
| 6,820,489 B2 * | 11/2004 | Fernald et al. | 73/705 |
| 6,865,194 B1 * | 3/2005 | Wright et al. | 372/6 |
| 7,027,672 B2 | 4/2006 | Tjin | |
| 7,164,813 B2 | 1/2007 | Bugaud | |
| 7,260,294 B2 * | 8/2007 | Kobayashi et al. | 385/37 |
| 7,406,877 B2 * | 8/2008 | Maurin | 73/800 |
| 7,671,432 B2 | 3/2010 | Fujii | |
| 7,720,324 B2 | 5/2010 | Haase et al. | |
| 2001/0019103 A1 | 9/2001 | Sugai et al. | |
| 2002/0028034 A1 | 3/2002 | Chen et al. | |
| 2002/0029626 A1 | 3/2002 | Koch et al. | |
| 2002/0092976 A1 | 7/2002 | Sugai et al. | |
| 2007/0284112 A1 | 12/2007 | Magne et al. | |
| 2009/0080829 A1 | 3/2009 | Haase et al. | |
| 2009/0097222 A1 | 4/2009 | Babutzka et al. | |

FOREIGN PATENT DOCUMENTS

| | | |
|---|---|---|
| EP | 1 124 112 | 8/2001 |
| EP | 1 129 327 | 9/2001 |
| EP | 1 148 324 | 10/2001 |
| GB | 2 421 075 | 6/2006 |
| JP | 02-306609 | 12/1990 |
| JP | 2003-279760 | 10/2003 |
| JP | 2005-134199 | 5/2005 |
| WO | WO 02/46712 | 6/2002 |
| WO | WO 2004/029570 | 4/2004 |
| WO | WO 2005/002887 | 1/2005 |

OTHER PUBLICATIONS

PCT, English Translation of PCT Written Opinion of the International Searching Authority for International Application PCT/EP2008/001258, mailed Jun. 4, 2008, 9 pages, European Patent Office, Muenchen, Germany.

* cited by examiner

OPTICAL STRAIN GAUGE

FIELD OF THE INVENTION

The invention relates to an optical strain gauge including a Bragg grating in an optical waveguide, as well as to a method of making such an optical strain gauge.

BACKGROUND INFORMATION

Optical strain gauges are known in the most varied forms and usually consist of a film-type carrier layer or are cast into such a carrier layer. These carrier layers have a bottom support or substrate on which an optical waveguide is fastened or secured, which includes a section with a fiber Bragg grating. By such a fiber Bragg grating, a coherent light beam fed into the optical waveguide is reflected with a certain wavelength, and can be detected as a reflection peak. If such an optical strain gauge is applied onto a deformation body, thereby due to a strain the wavelength of the reflection peak will vary proportionally to the strain. Such optical strain gauges are therefore usable similarly as electrical strain gauges with a resistance grid, and can be used for the detection of the most varied physical quantities or values.

In practice it has been noted, that such reflection peaks comprise several reflection maxima or a maximum that is considerably enlarged in width, due to mechanical tensions orthogonal to the fiber direction or due to transversely directed strain fields, whereby such maxima or such an enlarged maximum cannot be exactly resolved with an unambiguous wavelength in current evaluating devices.

Such an optical strain gauge for the measurement of mechanical tensions is known from the EP 1 129 327 B1. That relates to an optical strain gauge that is embodied as a fiberoptic rosette. Thereby the optical strain gauge consists of a carrier or support material that is embodied as a rigid flat plate, onto which an optical waveguide with three sections with respectively one fiber Bragg grating is glued, and which is covered by a further flat glued-on plate. In a different embodiment, the optical waveguide is encapsulated in a hard carrier or support material of a cured epoxy resin. For the strain measurement, the optical strain gauge with its plate-shaped bottom support or a bottom support consisting of an epoxy resin layer is glued onto a deformation or strain body, of which the strain is to be detected. For the adhesive glued mounting, the optical strain gauge with its bottom support must be tightly or fixedly pressed onto the deformation or strain body, whereby already strong transverse forces are introduced into the rigid epoxy resin layer or the plates. Due to the rigid connection with the fiber Bragg grating, then a remaining residual tension or stress can remain in the fiber Bragg grating, which often leads to a strong spreading or widening of the reflection peak. Such optical strain gauges with their fiber Bragg gratings encapsulated in epoxy resin or the fiber Bragg gratings glued between two hard plates can also, however, be fixedly inserted in carbon fiber reinforced composite materials or cement materials for the strain determination, whereby transverse forces, which partially also remain, are introduced into the fiber Bragg grating during the curing process. This then often leads to interferences in the fiber Bragg gratings, which lead to strong spreading or widening of the reflection peaks with one or several maxima, of which the reflection wavelengths can then only be detected sufficiently accurately with difficulty.

However, from the DE 196 48 403 C1, an optical sensor transducer for the detection measurement with an integrated fiber Bragg grating is known, in the fiber Bragg grating of which no transverse forces can be introduced, which could lead to a spreading or widening of the reflection peaks. This sensor transducer involves a force or load transducer with which both tension as well as compression forces can be detected. Therefore the optical waveguide is arranged with its fiber Bragg gratings between two spaced-apart clamping elements, which are pre-tensioned in the tension direction against one another by a compression spring and a strain body. Thereby the optical waveguide with its fiber Bragg grating section is arranged in the pipe-shaped strain body and is secured in a non-positive frictional or force-transmitting manner on the clamping elements. Apparently a soft filler material is provided in the area of the fiber Bragg grating in the hollow space between the strain body and the waveguide section with the fiber Bragg grating. For the force measurement, the force is introduced, in tension or compression, into the two clamping elements, whereby the waveguide section with the fiber Bragg grating can be expanded or extended as well as compressed or upset, and therewith its reflection wavelength changes in both directions proportionally to the force introduction. Due to the protected installation of the fiber Bragg grating section, the reflection peaks remain relatively narrow, so that the wavelength change is exactly detectable. However, such pipe-shaped transducer elements with the clamping elements provided perpendicularly thereto for the force introduction are very voluminous and complicated in the production. Moreover, such transducer elements also can only be secured with difficulty on the strainable surfaces that are to be detected. Still further, a portion of the strain measurement range in the tension direction is already lost due to the pre-tensioning, so that thereby larger strain effects are no longer detectable.

SUMMARY OF THE INVENTION

It is therefore the underlying object of the invention to provide an optical strain gauge that comprises a compact flat construction, and with which the strains to be detected are exactly detectable free of pre-tensioning.

The above object has been achieved according to the invention in an optical strain gage comprising an optical waveguide, first and second fastening elements, and an elastic fixing material. The optical waveguide includes a bare optical fiber portion that has no cladding thereon and that includes a sensing section with a Bragg grating incorporated in the sensing section. The first fastening element is made of a fastening material, is arranged at a first end of the sensing section displaced away from the Bragg grating, and surrounds and engages the bare optical fiber portion in a force-transmitting manner at the first end, such that forces applied to the first fastening element are coupled through the first fastening element into the bare optical fiber portion at the first end. The second fastening element is made of the fastening material, is arranged at a second end of the sensing section displaced away from the Bragg grating, and surrounds and engages the bare optical fiber portion in a force-transmitting manner at the second end, such that forces applied to the second fastening element are coupled through the second fastening element into the bare optical fiber portion at the second end. The elastic fixing material form-fittingly surrounds the sensing section of the bare optical fiber portion between the first and second ends and fills a space between the first and second fastening elements around the sensing section. The elastic fixing material is relatively soft compared to the fastening material, and mechanically isolates the sensing section from external forces between the first and second fastening elements.

The above object has further been achieved according to the invention in an optical strain gage comprising an optical waveguide, first and second fastening elements, and an elastic fixing material. The optical waveguide includes a sensing section that incorporates a Bragg grating therein. The first fastening element is made of a fastening material, is arranged at a first end of the sensing section displaced away from the Bragg grating, and surrounds and engages the optical waveguide in a force-transmitting manner at the first end, such that forces applied to the first fastening element are coupled through the first fastening element into the optical waveguide at the first end. The second fastening element is made of the fastening material, is arranged at a second end of the sensing section displaced away from the Bragg grating, and surrounds and engages the optical waveguide in a force-transmitting manner at the second end, such that forces applied to the second fastening element are coupled through the second fastening element into the optical waveguide at the second end. The elastic fixing material form-fittingly surrounds the sensing section of the optical waveguide between the first and second ends and fills a space between the first and second fastening elements around the sensing section. The elastic fixing material is relatively soft compared to the fastening material, and mechanically isolates the sensing section from external forces between the first and second fastening elements. The fastening material comprises a respective stack of fiberglass layers saturated with phenolic resin, respectively forming each one of the fastening elements.

Still further, the above object has been achieved according to the invention in a method of making such an optical strain gauge, including the steps:

a) on a first heatable pressure plate, arranging a first lower fastening strip, a second lower fastening strip, and a lower fixing strip between the first and second lower fastening strips, wherein the first and second lower fastening strips each respectively comprise a respective stack of the fiberglass layers saturated with the phenolic resin, and wherein the lower fixing strip consists of the elastic fixing material;

b) arranging the optical waveguide extending longitudinally on top of the first lower fastening strip, the lower fixing strip and the second lower fastening strip;

c) arranging a first upper fastening strip on top of the first lower fastening strip with the optical waveguide sandwiched and adhesively bonded therebetween, wherein the first upper fastening strip comprises a respective stack of the fiberglass layers saturated with the phenolic resin;

d) arranging a second upper fastening strip on top of the second lower fastening strip with the optical waveguide sandwiched and adhesively bonded therebetween, wherein the second upper fastening strip comprises a respective stack of the fiberglass layers saturated with the phenolic resin;

e) arranging an upper fixing strip on top of the lower fixing strip with the optical waveguide sandwiched and adhesively bonded therebetween, wherein the upper fixing strip consists of the elastic fixing material; and f) heating the first heatable pressure plate and a second heatable pressure plate, and pressing the pressure plates relatively toward one another so as to heat and press the fastening strips, the fixing strips and the optical waveguide therebetween, whereby the fastening material and the fixing material are heat-cured, to form the optical strain gage.

The invention has the advantage that the strain force in the longitudinal direction is uniformly introduced into the fiber Bragg grating section through the two flat fastening elements outside of the fiber Bragg grating section. Thereby, through the force-transmitting fastening elements, and the force-isolating elastic fixing material, a different unintended force introduction into the Bragg grating section is excluded or prevented, so that the reflection wavelength produces unambiguous reflection peaks, which make possible an exact detection of the reflection wavelength and therewith an exact strain detection.

Simultaneously the invention has the advantage that due to the relatively soft elastic sheathing or enveloping of the fiber Bragg grating section, it is fixed both in the longitudinal direction as well as in the transverse direction, but remaining material tensions or transverse forces are kept away from the strain measuring fiber Bragg grating section. Thereby, simultaneously, the optical waveguide is protected in its measuring region against mechanical damages and remaining deformations. Furthermore, the sheathing or enveloping of the fiber Bragg grating section with the relatively soft elastic plastic has the advantage that due to the pre-tension-free fixing or fastening, therewith also upsetting compressions are measurable, without the optical waveguide needing to be secured or fastened on a hard side guide.

The invention furthermore has the advantage that such an optical strain gauge with a pre-tension-free fixed fiber Bragg grating section can make use of the entire tension measuring range for a strain measurement, which considerably exceeds that of conventional electrical strain gauges, and which can additionally also detect upsetting compressions without loss of tension measuring range.

A further advantage of the invention is the simple production or fabrication of the optical strain gauge through the gluing or adhesive mounting of the optical waveguide with two different synthetic plastic materials, which is not significantly more complicated or costly than if the optical waveguide in its entirety would be adhesively bonded or enveloped with a non-positive frictional or force-transmitting fastening layer.

BRIEF DESCRIPTION OF THE DRAWINGS

The invention will be explained more closely in connection with an example embodiment, which is shown in the drawing. It is shown by.

DETAILED DESCRIPTION OF AN EXAMPLE EMBODIMENT OF THE INVENTION

Figure 1:
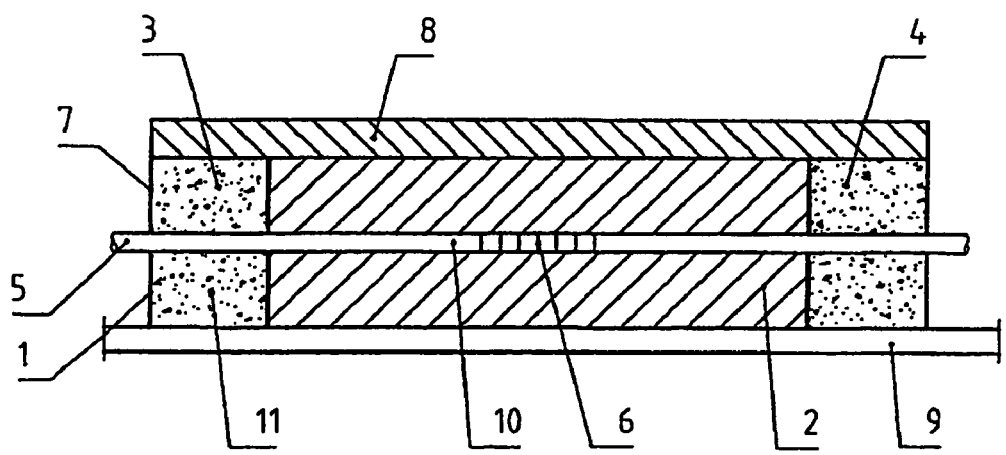
FIG. 1 a side view of an optical strain gauge as a schematic sectional drawing, and FIG. 2 a front view of an optical strain gauge as a schematic sectional view.

In FIG. 1 of the drawing, an optical strain gauge is schematically illustrated in a side view, whereby the strain gauge essentially consists of a bottom support or substrate 1 and of a top support 7, between which an optical waveguide 5 with a fiber Bragg grating 6 is glued or adhesively bonded, whereby the bottom support 1 and the top support 7 includes two flat fastening elements 3, 4 of a relatively hard well-adhering synthetic plastic arranged laterally next to the fiber Bragg grating section 10, and a relatively soft elastic fixing element 2 is provided therebetween. As shown in FIG. 1, the optical waveguide 5 especially includes a bare optical fiber portion 5 without a cladding thereon, and the fastening elements 3, 4 adhere directly onto the bare optical fiber portion.

The optical strain gauges involve a transducer element, which is preferably applied on a strain-sensitive deformation body 9, of which the strain is to be detected or sensed. Hereby this can involve a deformation body 9 for example of a force transducer or pick-up, which preferably consists of aluminum or for example a strain-sensitive part of an aircraft body, of which the strain shall directly be detected. For this reason, here a deformation body 9 of aluminum is provided, on which the optical strain gauge is applied. However, deformation bodies 9 or strain-sensitive structural components of other materials are conceivable, so it is especially provided, to integrate such optical strain gauges also in fiber reinforced composite materials or to apply such optical strain gauges thereon.

With regard to the provided deformation body 9 of aluminum, the optical strain gauge is directly glued-on or adhesively mounted by means of a synthetic plastic glue or adhesive that is not shown, which is also used in connection with electrical strain gauges. The optical waveguide 5 is linearly embodied and arranged on the bottom support 1, and is approximately half-way let into or embedded in this bottom support 1 by a special production process. In that regard, the bottom support 1 consists of its two lateral flat bottom fastening strips 11, which are provided on the left side and on the right side next to the Bragg grating section 10. Therebetween, as a part of the bottom support 1, a bottom fixing layer 2 is arranged, which at least fills out the fiber Bragg grating section 10 of the optical waveguide 5. The fastening strips 11 involve support films as they are also typical for electrical strain gauges, which here preferably consist of a stack of e.g. four phenolic resin saturated or impregnated individual glass fiber leaves, which represent fastening elements 3, 4 for the optical waveguide 5. These fastening elements 3, 4 involve a relatively hard cured synthetic plastic, which arises if the phenolic resin saturated or impregnated glass fiber leaves are heated to approximately 165° under pressure and thereby are glued or adhesively bonded with one another, and cure in a subsequent cooling-down. In that regard, the heating under pressure should be maintained for a suitable time for the cross-linking of approximately three hours.

On the other hand, the flat fixing layer 2 of the bottom support 1 provided between these fastening elements 3, 4 consists of a relatively soft elastic synthetic plastic, which similarly develops its adhesive force through a heating under the influence of pressure. Preferably, film-type acrylate adhesive strips are used therefor, which are also distributed by the Du Pont company under the tradename "Pyralux®". Through these adhesive strips between the two fastening elements 3, 4, after the curing there arises a form-fitting fixed connection of the optical waveguide 5 with its fiber Bragg grating section 10 on the deformation body 9, through which no transverse forces and mechanical tensions can be introduced into the fiber Bragg grating 6. This bottom support 1 of the two lateral fastening strips 11 and the fixing layer 2 arranged therebetween has everywhere the same height of approximately 0.2 to 0.25 mm and is preferably approximately 30 to 40 mm long. In that regard, the optical waveguide 5 is surrounded or enveloped halfway to a height of approximately 90 µm by the fixing layer 2 and is fixedly glued or adhesively bonded therewith.

Figure 2:
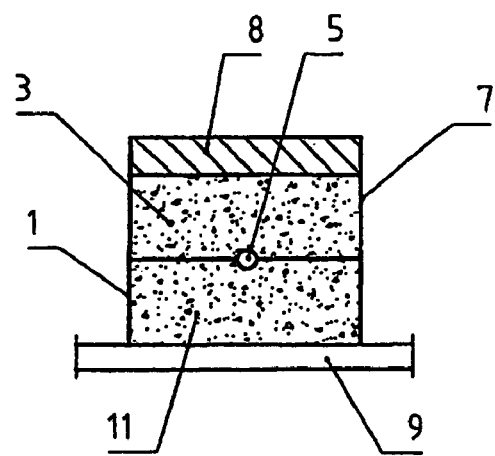

The arrangement of the optical waveguide 5 between the bottom support 1 and the top support 7 can be seen in detail from the FIG. 2 of the drawing. In that regard, the optical strain gauge has approximately a total width of preferably approximately 5 to 10 mm, which is sufficient to well surround or envelope the approximately 180 µm thick optical waveguide 5 and simultaneously ensure a fixed secure application on the deformation body 9.

Above the bottom support 1 and on the optical waveguide 5, additionally a flat layer of a top support 7 is provided, which similarly comprises a hard well-adhering layer of fastening strips on the right side and the left side, and which forms a force-transmitting connection with the bottom fastening strips 11 and the optical waveguide 5, and respectively represents a fastening element 3, 4. In that regard also the two top fastening strips 11 are preferably built-up of phenolic resin saturated or impregnated glass fiber strips, which halfway surround in a force-transmitting manner, the optical waveguide 5 without the fiber Bragg grating section 10.

The strain forces are introduced into the optical waveguide 5 or its fiber Bragg grating 6 in the fiber longitudinal direction exclusively through the fastening elements 3, 4 constructed in this manner. For the securing or fastening with the optical waveguides 5, the two phenolic resin saturated glass fiber strips 11 are temporarily for a short time heated to 165° under pressure, and are then slowly cooled down for the curing. Thereby there arises a hard force-transmitting connection with the optical waveguide 5, which comprises only a very small creep characteristic.

Also on the top support layer 7, between the two lateral top fastening strips 11, a top fixing layer 2 of a soft elastic synthetic plastic adhesive, preferably the acrylate adhesive, is arranged, which similarly halfway covers the optical waveguide 5 especially also the section 10 with the fiber Bragg grating 6, and thereby completely surrounds it together with the bottom fixing layer 2. In that regard similarly both fixing layers 2, namely both of the top support 7 as well as of the bottom support 1, are adhesively bonded with the optical waveguide 5 by a heating process under the influence of pressure. Because this middle or central part of the optical strain gauge is embodied relatively soft and elastic of the two fixing layers as a fixing element 2, thereby it fixes only the optical waveguide section 10 with the fiber Bragg grating 6 in its longitudinal and transverse direction, whereby it is so soft and elastic, that thereby no transverse or longitudinal forces can be introduced continuously into the fiber Bragg grating 6. Thereby, especially, a remaining introduction of transverse forces is prevented during the assembly or installation or during the strain process, by which the width of the maxima of the reflection peaks could be varied.

Similarly as for the bottom support 1, also the flat layer of the top support 7 is provided in a height of preferably 0.2 to 0.25 mm, by which the approximately 180 µm diameter thick optical waveguide 5 is also embedded in a form-fitting connection in the middle or central region. Because the fastening strips 11 and the fixing layers 2 in the longitudinal direction only bluntly butt against one another, additionally a cover layer 8 is applied onto the entirety of the top support layer 7, which cover layer preferably also consists of a soft elastic adhesive layer of an acrylate synthetic plastic.

For the production or fabrication of the optical strain gauge, the individual leaf-type strips 11 of the fastening elements 3, 4 and of the fixing elements 2 are first laid on the bottom support 1 next to one another in the longitudinal direction and above one another in the height, on a heatable pressure plate. Then the linear light waveguide 5 is symmetrically arranged thereon, and in a similar manner the leaf-type strips and layers of the top support 7 are positioned thereon. For the longitudinal connection, then still the common cover layer 8 is laid over the entire surface of the strain gauge. This entire layered construction is then arranged between two heatable pressure plates and heated to a temperature of approximately 165°, and under a certain pressure one allows the whole thing to cool-down slowly. Thereby there arises the fixed or tight force-transmitting connection at the end regions of the optical waveguide 5, and the soft elastic connection in the middle region and the fiber Bragg grating section 10. In that regard, already due to the relatively soft elastic fixing element 2 it is prevented that already during the production strong transverse forces are introduced into the Bragg grating section 10, that could lead to a remaining change of the fiber Bragg grating structure 6. Because due to such an arrangement of the fiber Bragg grating 6 within the fixing elements 2, the strain forces are introduced into the fiber Bragg grating 6 only through the fastening elements 3, 4 on the longitudinal sides or ends, there arises an unambiguous narrow reflection peak with a clear maxima, of which the wavelength is exactly detectable, like with a pre-tensioning of the fiber Bragg grating 6. Namely only through an exact detectability in connection with a change of the fiber Bragg grating wavelength can an exact measurement signal for the strain behavior of the deformation body be obtained.

The inventive optical strain gauge, however, need not be constructed layer-wise, but rather the bottom support regions and top support regions can also be produced as a unitary or integral synthetic layer, by which the optical waveguide 5 is potted or surrounded by casting. In that regard, simply the fastening elements 3, 4 must consist of a well-adhering relatively hard material, which is connected in a force-transmitting manner with the two optical waveguide ends that adjoin on the fiber Bragg grating section 10. Therebetween a fixing element 2 is then to be arranged in the middle part, which fixing element can also be cast in one piece and simply must achieve a fixing of the fiber Bragg grating section 10. Preferably also an elastic soft synthetic plastic material is provided for that purpose.

The invention claimed is:

1. An optical strain gage comprising:
an optical waveguide including a bare optical fiber portion that has no cladding thereon and that includes a sensing section with a Bragg grating incorporated in said sensing section;
a first fastening element that is arranged at a first end of said sensing section displaced away from said Bragg grating, and that surrounds and engages said bare optical fiber portion in a force-transmitting manner at said first end, such that forces applied to said first fastening element are coupled through said first fastening element into said bare optical fiber portion at said first end;
a second fastening element that is arranged at a second end of said sensing section displaced away from said Bragg grating, and that surrounds and engages said bare optical fiber portion in a force-transmitting manner at said second end, such that forces applied to said second fastening element are coupled through said second fastening element into said bare optical fiber portion at said second end; and
an elastic fixing material that form-fittingly surrounds said sensing section of said bare optical fiber portion between said first and second ends and fills a space between said first and second fastening elements around said sensing section;
wherein each one of said fastening elements respectively comprises at least two fastening strips of a hard adhesive plastic, which are stacked and adhesively bonded on top of one another, with said bare optical fiber portion received and adhesively bonded between said fastening strips; and
wherein said elastic fixing material is relatively soft compared to said hard adhesive plastic of said fastening elements, and mechanically isolates said sensing section from external forces between said fastening elements.

2. The optical strain gage according to claim 1, constructed and configured as a flat rectangular parallelepiped film body, wherein each one of said fastening elements respectively comprises a top portion comprising a top one of said fastening strips and a bottom portion comprising a bottom one of said fastening strips, said elastic fixing material comprises a top portion and a bottom portion, said bottom portions of said fastening elements and of said elastic fixing material together form a rectangular flat thin bottom support layer, said top portions of said fastening elements and of said elastic fixing material together form a rectangular flat thin top support layer, and said bare optical fiber portion is sandwiched between said bottom support layer and said top support layer along an interface therebetween.

3. The optical strain gage according to claim 2, wherein an adhesive bonding junction is formed along said interface between said bottom support layer and said top support layer, said bare optical fiber portion extends linearly along said interface, and said top and bottom support layers are adhesively bonded to one another and to said bare optical fiber portion by said adhesive bonding junction along said interface.

4. The optical strain gage according to claim 1, wherein said first and second fastening elements are limited and isolated to said bare optical fiber portion that has no cladding, and said first and second fastening elements do not engage a fiber cladding.

5. The optical strain gage according to claim 1, further comprising a strainable body of metal, onto which a bottom surface of said first and second fastening elements and a bottom surface of said elastic fixing material are directly adhesively bonded by an adhesive.

6. The optical strain gage according to claim 1, further comprising a top cover layer of a soft elastic plastic that is arranged on top of and covers said first and second fastening elements and said elastic fixing material, wherein said top cover layer extends along a longitudinal direction of said bare optical fiber portion no farther than a longitudinal extent of said bare optical fiber portion that has no cladding.

7. The optical strain gage according to claim 6, wherein said elastic fixing material and said top cover layer each consist of a soft elastic adhesive acrylate plastic.

8. The optical strain gage according to claim 1, wherein said elastic fixing material consists of an acrylate plastic.

9. The optical strain gage according to claim 8, wherein said elastic fixing material consists of plural adhesive film layers of said acrylate plastic stacked and adhered onto one another.

10. The optical strain gage according to claim 1, wherein said hard adhesive plastic of said fastening strips is a hard heat-cured cross-linked plastic.

11. The optical strain gage according to claim 1, wherein each one of said fastening strips respectively comprises a stack of fiberglass layers saturated with phenolic resin.

12. An optical strain gage comprising:
an optical waveguide including a sensing section that incorporates a Bragg grating therein;
a first fastening element made of a fastening material that is arranged at a first end of said sensing section displaced away from said Bragg grating, and that surrounds and engages said optical waveguide in a force-transmitting manner at said first end, such that forces applied to said first fastening element are coupled through said first fastening element into said optical waveguide at said first end;
a second fastening element made of said fastening material that is arranged at a second end of said sensing section displaced away from said Bragg grating, and that surrounds and engages said optical waveguide in a force-transmitting manner at said second end, such that forces applied to said second fastening element are coupled through said second fastening element into said optical waveguide at said second end; and an elastic fixing material that form-fittingly surrounds said sensing section of said optical waveguide between said first and second ends and fills a space between said first and second fastening elements around said sensing section;

wherein said elastic fixing material is relatively soft compared to said fastening material, and mechanically isolates said sensing section from external forces between said first and second fastening elements; and wherein said fastening material comprises a respective stack of fiberglass layers saturated with phenolic resin, respectively forming each one of said fastening elements.

13. A method of making the optical strain gage according to claim 12, comprising steps:

a) on a first heatable pressure plate, arranging a first lower fastening strip, a second lower fastening strip, and a lower fixing strip between said first and second lower fastening strips, wherein said first and second lower fastening strips each respectively comprise a respective said stack of said fiberglass layers saturated with said phenolic resin, and wherein said lower fixing strip consists of said elastic fixing material;

b) arranging said optical waveguide extending longitudinally on top of said first lower fastening strip, said lower fixing strip and said second lower fastening strip;

c) arranging a first upper fastening strip on top of said first lower fastening strip with said optical waveguide sandwiched and adhesively bonded therebetween, wherein said first upper fastening strip comprises a respective said stack of said fiberglass layers saturated with said phenolic resin;

d) arranging a second upper fastening strip on top of said second lower fastening strip with said optical waveguide sandwiched and adhesively bonded therebetween, wherein said second upper fastening strip comprises a respective said stack of said fiberglass layers saturated with said phenolic resin;

e) arranging an upper fixing strip on top of said lower fixing strip with said optical waveguide sandwiched and adhesively bonded therebetween, wherein said upper fixing strip consists of said elastic fixing material; and f) heating said first heatable pressure plate and a second heatable pressure plate, and pressing said pressure plates relatively toward one another so as to heat and press said fastening strips, said fixing strips and said optical waveguide therebetween, whereby said fastening material and said fixing material are heat-cured, to form said optical strain gage.

14. The method according to claim 13, further comprising arranging a continuous top cover layer of an adhesive acrylate film on top of said upper fastening strips and said upper fixing strip before carrying out said step f).

15. An optical strain gage comprising:

an optical waveguide including a bare optical fiber portion that has no cladding thereon and that includes a sensing section with a Bragg grating incorporated in said sensing section;

a first fastening element made of a fastening material that is arranged at a first end of said sensing section displaced away from said Bragg grating, and that surrounds and engages said bare optical fiber portion in a force-transmitting manner at said first end, such that forces applied to said first fastening element are coupled through said first fastening element into said bare optical fiber portion at said first end;

a second fastening element made of said fastening material that is arranged at a second end of said sensing section displaced away from said Bragg grating, and that surrounds and engages said bare optical fiber portion in a force-transmitting manner at said second end, such that forces applied to said second fastening element are coupled through said second fastening element into said bare optical fiber portion at said second end; and an elastic fixing material that form-fittingly surrounds said sensing section of said bare optical fiber portion between said first and second ends and fills a space between said first and second fastening elements around said sensing section;

wherein said elastic fixing material is relatively soft compared to said fastening material, and mechanically isolates said sensing section from external forces between said first and second fastening elements; and wherein said elastic fixing material consists of plural adhesive film layers of an acrylate plastic stacked and adhered onto one another.

* * * * *